United States Patent [19]
Dyer et al.

[11] Patent Number: 4,750,603
[45] Date of Patent: Jun. 14, 1988

[54] SOFT-HANDLING DROP SHUTTLE

[75] Inventors: John J. Dyer, Shoreview; Jonathan P. Buesing, St. Paul; Richard D. Anderson, Maple Grove, all of Minn.

[73] Assignee: Micro Component Technology, Inc., St. Paul, Minn.

[21] Appl. No.: 870,612

[22] Filed: Jun. 3, 1986

[51] Int. Cl.⁴ ............................................. B65G 37/00
[52] U.S. Cl. ............................ 198/463.3; 198/468.2; 198/409
[58] Field of Search .................. 198/463.3, 468.2, 409, 198/468.6

[56] References Cited

U.S. PATENT DOCUMENTS

| | | | |
|---|---|---|---|
| 2,542,503 | 2/1951 | Galloway | 198/409 X |
| 3,084,779 | 4/1963 | Miladek et al. | 198/463.3 |
| 3,863,751 | 2/1975 | Vignon | 198/468.6 X |
| 4,387,796 | 6/1983 | Enomae | 198/409 X |

*Primary Examiner*—Randolph A. Reese
*Assistant Examiner*—Anthony Knight
*Attorney, Agent, or Firm*—Lawrence M. Nawrocki

[57] ABSTRACT

A soft-handling drop shuttle for use in an integrated circuit device handler. The invention includes a shuttle assembly (10) which pivots from a first position, in registration with an intake chute (36), and a second position, in registration with a discharge chute (50). The shuttle assembly (10) includes a shuttle lower jaw (14) for supporting an integrated circuit device (38) during its transfer, and a shuttle upper jaw (22), which is pivotally attached by an upper jaw pivot shaft (32) to the shuttle assembly (10). Upper jaw (22) retains the integrated circuit device (38) within the shuttle assembly (10) during the movement of the shuttle. The shuttle upper jaw (22) includes a stop portion (54) and an associated leaf spring (28) for retaining and clamping the integrated circuit device (38) within the shuttle assembly (10). Interchangeable shuttle lower jaws (14, 14') enable adaptation of assembly (10) to accommodate integrated circuit devices (38) of varying sizes and types.

19 Claims, 2 Drawing Sheets

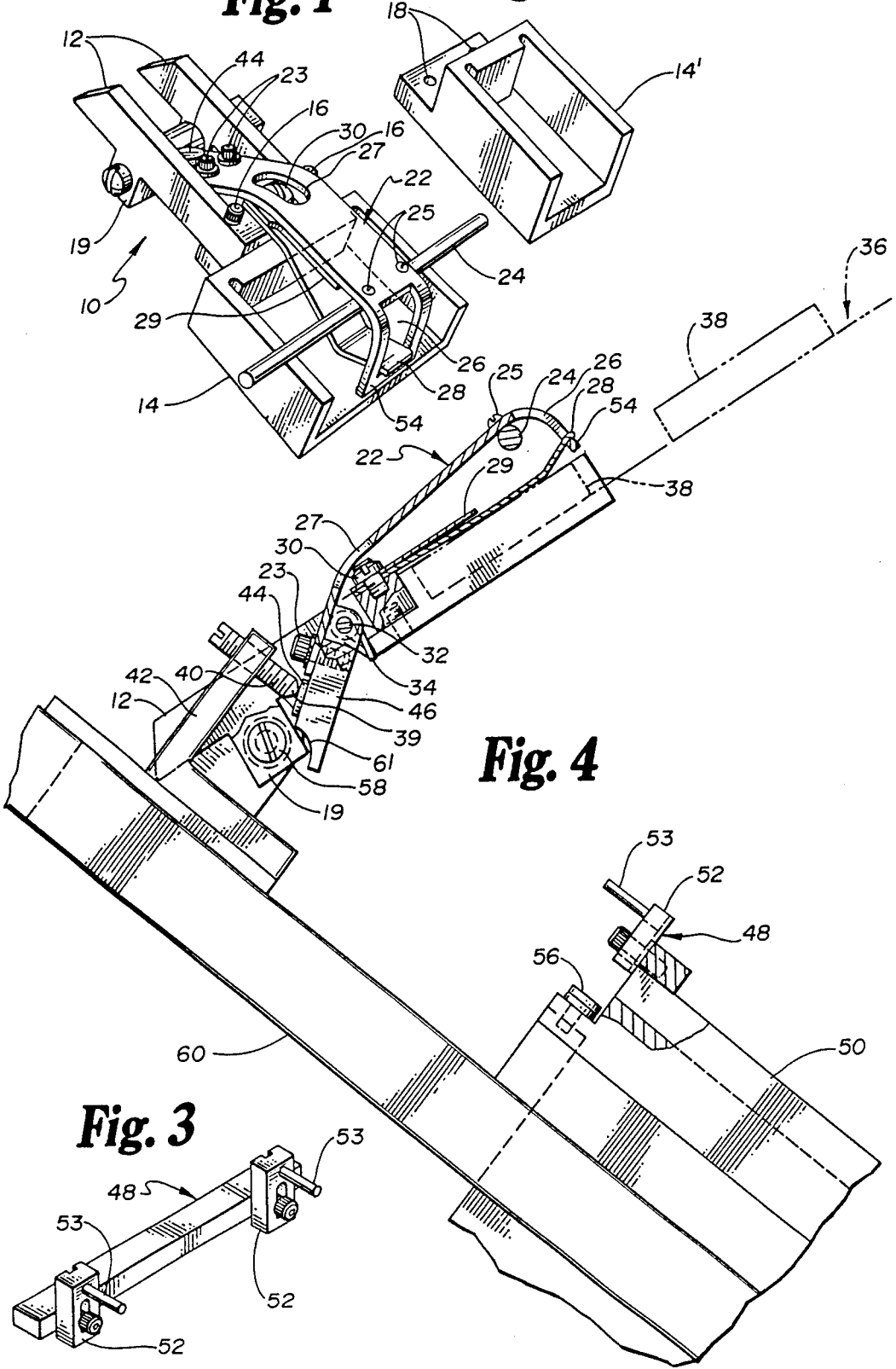

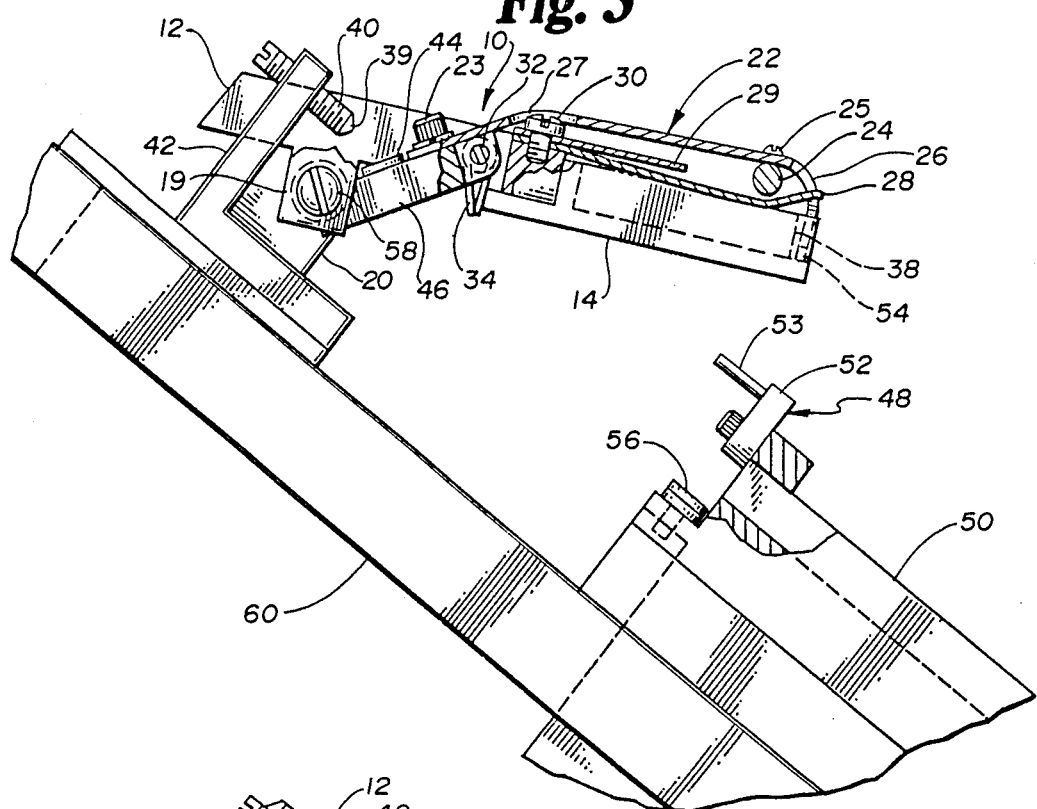
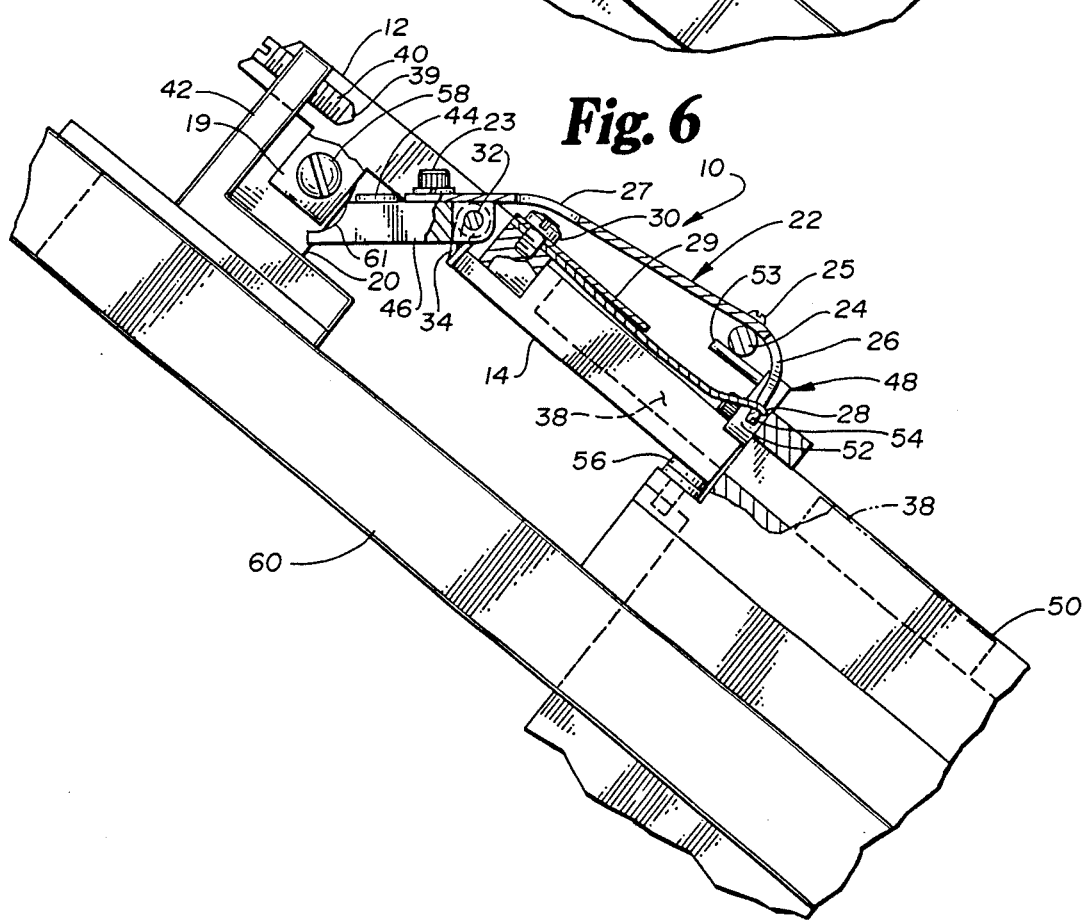

SOFT-HANDLING DROP SHUTTLE

TECHNICAL FIELD

The present invention is generally related to the field of integrated circuit device handlers. More narrowly, the invention is directed to handlers utilizing drop shuttles for the isolation, or singulation, of individual integrated circuit devices. The invention specifically deals with a soft-handling drop shuttle integrated circuit device handler.

BACKGROUND OF THE INVENTION

Various types of integrated circuit device handlers have been utilized to isolate, or singulate, integrated circuit devices for testing and sorting. The following are illustrative of handlers wherein the integrated circuit devices are singulated: devices with on-track testing wherein the integrated circuit devices are transferred by gravity means, cam operated transfer mechanisms, wheel type rotating carriers utilizing air jets and/or magnets as transfer means, and carriers with pusher bars as transfer means.

Typical drop shuttle type handlers retain an integrated circuit device between two plates. Typically, these handlers have at least one open end. This open end of the carrier exposes the ceramic body of the integrated circuit device to abrasion with an arcuate wall which holds the device in the carrier during the handling process, or, in the case of leaded integrated circuit devices, the leads are exposed and bent or otherwise damaged during the handling process.

It is to these problems in the prior art that the invention of the present application is directed. It is an integrated circuit device handler which can be applied to virtually any size or type of integrated circuit device.

SUMMARY OF THE INVENTION

The present invention is a soft-handling device for handling and transferring integrated circuit devices. It includes a shuttle assembly as means to effect the handling and singulating of individual integrated circuit devices. The apparatus further includes means for pivoting the shuttle assembly between a first position, in registration with an intake chute, and a second position, in registration with an output chute. The shuttle assembly includes means for enveloping and retaining an integrated circuit device within the shuttle assembly. The enveloping means, normally in a closed position, employs means for overcoming biasing toward the closed position to allow integrated circuit device ingress into or egress from the shuttle assembly.

The device of this document can include a block or frame on which the shuttle assembly is pivotally mounted. The elements of the shuttle assembly can include a shuttle lower jaw mounted to a shuttle support and pivotal therewith relative to the block or frame. Additionally, the shuttle assembly can include a shuttle upper jaw which is pivotally mounted relative to the shuttle lower jaw. Means for biasing the shuttle upper jaw to a normally closed position can also be employed. Means for urging the shuttle upper jaw to an open position when the shuttle assembly is in its first or its second position are utilized.

The shuttle lower jaw can be comprised of one of a plurality of interchangable lower jaws of various sizes which are individually attachable by fastening means and adapt the shuttle assembly to fit various sized integrated circuit devices.

The enveloping means of the shuttle assembly can include the shuttle lower jaw as a bottom support and a shuttle upper jaw which may be used to help retain the integrated circuit device once it is within the shuttle assembly. Additionally, the shuttle upper jaw, in a preferred embodiment, includes a stop, and, when in place, the carried integrated circuit device is surrounded on all sides. Additionally, releasable clamping means for securing the integrated circuit device within the shuttle assembly can further facilitate retention in place of a held device.

The shuttle upper jaw can act, in conjunction with the shuttle lower jaw, as a clam shell closing upon an integrated circuit device when the shuttle assembly is in its normal, or closed, position. The shuttle assembly is, in this embodiment, urged to an open position at its first orientation by a block mounted shoulder, mounted proximate the pivotably mounted end of the shuttle assembly, striking the shuttle upper jaw support arm. This pivots the shuttle upper jaw out of its normally closed position to an open position for device intake. An arcuate cutout on the shuttle upper jaw support arm can engage the shuttle assembly shaft to limit movement of the shuttle upper jaw toward a closed position. Therefore, when the shuttle upper jaw is closed, the shuttle upper jaw stop engages the shuttle lower jaw and the arcuate cutout on the shuttle upper jaw support arm engages the shuttle assembly shaft.

Thereafter, the shuttle assembly is pivoted toward its second position. When the shuttle assembly moves from its first position to its second position in registration with a discharge chute, the shuttle upper jaw returns to its normal, closed position and retains the integrated circuit device received from the intake chute.

Once the shuttle assembly has reached its second position, the upper jaw is again opened, here by means of a shaft carried by the shuttle upper jaw and mounted transversely thereto. In the preferred embodiment, this transverse shaft is mounted inside the shuttle upper jaw proximate a jaw stop end of the shuttle. The transverse shaft engages one or more prongs mounted proximate the discharge chute as the assembly approaches its second position, to open the shuttle upper jaw and allow discharge of the carried device.

The releasable clamping means of the shuttle assembly can comprise a leaf spring mounted between the shuttle upper jaw and the shuttle lower jaw and extending through an aperture formed in the shuttle upper jaw. A leaf spring stabilizer, extending part way along the length of the leaf spring, acts to stiffen the leaf spring and make it more resilient. The leaf spring, when the shuttle upper jaw regains its normal or closed position, tightly engages the integrated circuit device held within the shuttle and secures it therein.

It is an object of this invention to provide a universal integrated circuit device soft-handling drop shuttle for the handling and transferring of integrated circuit devices of various sizes and types by use of a shuttle assembly that can envelope and hold secure an integrated circuit device within the shuttle assembly during the transfer process. The device of this apparatus thus reduces the potential for damage to the integrated circuit device while it is in transit. More specific advantages will become apparent with reference to the detailed description of the invention, claims, and appended drawings.

BRIEF DESCRIPTION OF THE DRAWINGS

FIG. 1 is a perspective view of the shuttle assembly;

FIG. 2 is a perspective view of an interchangable shuttle lower jaw;

FIG. 3 is a perspective view of the prong assembly mounted the discharge chute;

FIG. 4 is a right side elevational view, with parts cut away, diagraming the shuttle assembly in its first position in registration with an input chute;

FIG. 5 is a right side elevational view, with parts cut away, diagraming the shuttle assembly as it is pivoting from its first position to a second position; and FIG. 6 a right side elevational view, with parts cut away, diagraming the shuttle assembly in its second position, angularly spaced from the first position, in registration with a device discharge chute.

DETAILED DESCRIPTION

Referring now to the drawings, wherein like reference numerals denote like elements throughout the several views, FIG. 1 generally illustrates a shuttle assembly 10. The assembly includes at least one shuttle support arm 12 to which is fixedly mounted a shuttle lower jaw 14. The figure illustrates a pair of parallel, spaced support arms 12.

The shuttle assembly 10 can be adapted to handle integrated circuit devices of varying size and type by the use of an interchangeable shuttle lower jaw 14. FIG. 2 illustrates one of several alternative interchangeable shuttle lower jaws 14' which may be fixedly mounted to the shuttle support arms 12.

In the preferred embodiment, as shown in FIG. 1, the shuttle lower jaw 14 can be secured to arms 12 by screws 16. However, other methods of attachment can be utilized. FIG. 2 illustrates apertures 18 within the interchangeable shuttle lower jaw 14' by which the screws 16 or other attachment means connects the shuttle lower jaw 14, 14' to the shuttle assembly 10.

FIGS. 4, 5, and 6 illustrate in more detail structure by which the shuttle support arms 12 are pivotally mounted with respect to a shuttle assembly shaft 58. Arms 12 carry appendages 19 having apertures (not shown) therethrough. Shaft 58 is extended through these apertures and corresponding apertures in shaft mount 20.

A shuttle upper jaw 22, as illustrated in FIG. 1, carries a transversely mounted shaft 24 that, in the preferred embodiment, is secured to jaw 22 by screw means 25. Affixation is typically made to the inside of the shuttle upper jaw 22. The upper jaw 22 has a first aperture 26 formed therein for receipt of a leaf spring 28 therein.

Additionally, the shuttle upper jaw 22 has a second aperture 27 to provide access to the leaf spring attachment means such as screw 30. The leaf spring 28 is mounted, in the preferred embodiment, by screw 30 to the upper sides of shuttle support arms 12.

The shuttle upper jaw 22 is shown as being mounted by screws 23 to an upper jaw support arm 46. This upper jaw support arm 46 carries a striker plate 44. The arm 46 is pivotally attached by means of a shaft 32 to, and between, shuttle support arms 12.

Spring biasing means 34, which can be associated with the shuttle upper jaw pivot shaft 32, bias the shuttle upper jaw 22 toward a downward or closed position. This is the normal position for the shuttle upper jaw 22 and is illustrated in FIG. 5.

The leaf spring 28, even though it protrudes through shuttle upper jaw first aperture 26, is unaffected by the shuttle upper jaw 22 in its position relative thereto (as seen in FIG. 5) until the jaw 22 is pivoted to an open position (as seen in FIGS. 4 and 6). Then a bottom edge of the aperture 26 lifts the leaf spring 28 to a retracted position.

Two methods are utilized to pivot the upper jaw 22, and therefore withdraw the leaf spring 28, to an open position. These methods will be described hereinafter.

A leaf spring stabilizer 29 may be mounted above, and in overlying relationship relative to, leaf spring 28. Stabilizer 29 can be attached by the leaf spring screw means 30 to increase rigidity and limit the amount of flexibility of leaf spring 28.

The shuttle upper jaw support arm 46 can have an arcuate cutout 61 at an end remote from an end by which it is pivotally mounted by shaft 32. When the shuttle assembly is in a position wherein jaw 22 is closed, cutout 61 engages shaft 58 to, thereby, limit the movement of jaw 22 beyond a closed position. As previously discussed, spring biasing means 34 urges shuttle upper jaw 22 to the closed position. The result of these effects is to hold the shuttle upper jaw 22 in a tensioned position until forced open.

FIG. 4 illustrates the shuttle assembly 10 in its first position in registration with an intake chute 36. Integrated circuit devices 38 are shown in phantom exiting chute 36 and being received within the shuttle assembly 10.

In order to overcome the effect of spring means 34 biasing the shuttle upper jaw 22 closed, in order to open jaw 22 to allow receipt of integrated circuit devices 38, jaw 22 is retracted. This is accomplished by a shoulder 39 of an adjustable element 40 mounted on a mount 42. Shoulder 39 engages striker plate 44 as assembly 10 is pivoted upwardly by any appropriate means.

The rotation of the assembly 10 to its upper position brings the shoulder 39 into contact with the shuttle upper jaw striker plate 44. This contact causes the shuttle upper jaw 22 to pivot to an open position.

Because the leaf spring 28 is fixedly attached to the shuttle support arms 12 and protrudes through aperture 26 in the shuttle upper jaw 22, it is flexed away from lower jaw 14 by the pivoting of jaw 22. The lower edge of the first aperture 26 urges the leaf spring 28 upward to the withdrawn position as seen in FIG. 4.

FIG. 3 illustrates vertically adjustable prong mounts 52 carried by support 48. Support 48 is mounted proximate a discharge chute 50. The prongs 53 are engaged by the transverse shaft 24 carried by the upper jaw 22 when assembly 10 is rotated to its second position in registration with discharge chute 50 as seen in FIG. 6 to lift upper jaw 22 and leaf spring 28.

FIG. 5 shows the shuttle assembly between its first and second positions. In FIG. 5, the shuttle upper jaw 22 is in its normal or closed position with a stop portion 54 of jaw 22 holding an integrated circuit device 38, shown in phantom, in place. FIG. 5 also illustrates the clamping action of the leaf spring 28 holding the integrated circuit device 38 motionless within the shuttle assembly 10.

FIG. 6 illustrates the shuttle assembly 10 in a second position in registration with discharge chute 50. The shuttle upper jaw 22 is again pivoted out of the way to raise stop 54 of upper jaw 22 and leaf spring 28 protruding through aperture 26. This lifting allows the integrated circuit device 38 to pass out of the shuttle assembly 10 by gravity into discharge chute 50.

The shuttle lower jaw 14 is shown seated on a cushioned stop 56 associated with chute 50. This stop 56 allows the shuttle lower jaw 14 to come into alignment with chute 50 without bypassing it.

The prongs 53 hold the shuttle upper jaw 22 and the leaf spring 28 at a certain post while the shuttle lower jaw 14 and other elements of assembly 10 continue downwardly to a lower position. In view of the shuttle upper jaw 22 being held open, leaf spring 28, protruding through aperture 26, is also held in a retracted position to permit the integrated circuit device 38 in the shuttle assembly 10 to enter discharge chute 50 mounted on platen 60.

As will be able to be seen in view of this disclosure, a number of the structural elements afford a feature of adjustability which can be taken advantage of depending upon the circumstances. For example, the location of the prongs 53 and the positions at which they will be engaged by transverse bar 24 can be varied by adjusting the location of mounts 52 relative to the support 48. Additionally, element 40 can be adjusted to vary the position of shoulder 39. As will be able to be seen, therefore, the sensitivity with which upper jaw 22 and leaf spring 28 are lifted in both the upper and lower positions of assembly 10 can be changed depending upon the size of integrated circuit devices 38 being handled.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. Apparatus for handling and transferring integrated circuit devices, comprising:
   (a) a shuttle assembly having a common port for ingress and egress of an integrated circuit device through the same side of said common port;
   (b) means for pivoting said shuttle assembly between a first position, with said port in registration with an intake chute, and a second position, angularly spaced from said first position, with said port in registration with a device discharge chute;
   (c) means for enveloping, in a normally closed position, and retaining against movement relative to said shuttle assembly an integrated circuit device within said shuttle assembly; and
   (d) means for overcoming the normally closed enveloping means to allow a device ingress into or egress from said shuttle assembly through said common port.

2. The apparatus of claim 1 wherein said shuttle assembly futher comprises:
   (a) a block mount;
   (b) a shutter support pivotably mounted to said block mount;
   (c) a shuttle lower jaw carried by said shuttle support and pivotal therewith relative to said block mount;
   (d) a shuttle upper jaw pivotally mounted relative to said shuttle lower jaw; and
   (e) means for biasing said shuttle upper jaw to a normally closed position.

3. The apparatus of claim 2 wherein said shuttle lower jaw comprises one of a plurality of interchangeable lower jaws of various sizes attachable by fastening means for adapting said shuttle assembly to various types and sizes of integrated circuit devices.

4. The apparatus of claim 1 wherein said means for enveloping an integrated circuit device within said shuttle assembly futher comprises:
   (a) a shuttle lower jaw for supporting integrated circuit devices carried by said shuttle assembly;
   (b) a shuttle upper jaw, which pivots with respect to said shuttle lower jaw, for holding integrated circuit devices therebetween;
   (c) a stop carried by said shuttle upper jaw for retaining said integrated circuit device within said shuttle assembly; and
   (d) means for releasably clamping an integrated circuit device within said shuttle assembly between said upper and lower jaws.

5. The apparatus of claim 2 wherein said means for overcoming the normally closed enveloping means when said shuttle assembly is in said first position thereof comprises a block mounted shoulder for striking said shuttle upper jaw to pivot said shuttle upper jaw to an open position for integrated circuit device ingress through said common port.

6. The apparatus of claim 2 wherein said means for overcoming the normally closed enveloping means when said shuttle assembly is in said second position thereof comprises:
   (a) a shaft carried by said shuttle upper jaw and held generally transverse thereto; and
   (b) a pair of prongs mounted proximate said discharge chute for engaging said shaft when said shuttle assembly pivots to its second position, and for lifting said shaft-carring shuttle upper jaw to an open position for device egress through said common port.

7. The apparatus of claim 4 wherein said means for releasably clamping an integrated circuit device within said shuttle assembly further comprises:
   (a) a leaf spring, carried by said shuttle upper jaw, and extending through an aperture formed in said shuttle upper jaw, for clamping integrated circuit devices, received in said shuttle assembly, against said lower jaw; and
   (b) means for lifting said leaf spring from a position clamping an integrated circuit device against said lower jaw.

8. Apparatus for handling and transferring integrated circuit devices comprising:
   (a) a shuttle assembly;
   (b) means for pivoting said shuttle assembly between a first position, in registration with an intake chute, and a second position, angularly spaced from said first position, in registration with a device discharge chute;
   (c) a leaf spring for releasably clamping an integrated circuit device within said shuttle assembly;
   (d) means for withdrawing said leaf spring clamping means to permit shuttle receipt of integrated circuit devices when said shuttle asembly is in said first position; and
   (e) means for withdrawing said leaf spring clamping means to effect shuttle output of integrated circuit devices when said shuttle assembly is in said second position.

9. The apparatus of claim 8 wherein said shuttle assembly comprises:
   (a) a block mount;
   (b) a shuttle support pivotably mounted to said block mount;
   (c) a shuttle lower jaw carried by said shuttle support and pivotal therewith with respect to said block mount;
   (d) a shuttle upper jaw pivotally mounted with respect to said shuttle lower jaw;
   (e) means for biasing said shuttle upper jaw to a closed position;
   (f) means for urging said shuttle upper jaw to an open position when said shuttle assembly is in said first and second positions thereof.

10. The apparatus of claim 9 wherein said means for urging said shuttle upper jaw to an open position when said shuttle assembly is in said first position thereof further comprises a block mounted shoulder for abutting said pivotable upper jaw to an open position when said shuttle assembly is pivoted to its first position.

11. The apparatus of claim 9 wherein said means for urging said shuttle upper jaw to an open position when said shuttle assembly is in said second position thereof further comprises:
   (a) a shaft carried by said shuttle upper jaw, held tranversely thereto; and
   (b) at least two prongs mounted proximate a discharge chute for abutting said shaft and opening said upper jaw thereassociated when said shuttle assembly pivots to a second position.

12. The apparatus of claim 8 wherein said means for withdrawing said leaf spring clamping means to permit shuttle receipt of integrated circuit devices when said shuttle assembly is in said first position further comprises:
   (a) a fixed mount for attaching said leaf spring clamping means to said pivotable shuttle assembly;
   (b) a shuttle upper jaw of said shuttle assembly, pivotally mounted thereto, with an aperture retained therein for passage of said leaf spring clamping means therethrough; and
   (c) a block mounted shoulder for abutting said shuttle upper jaw pivoting said shuttle upper jaw to an open position when said shuttle assembly is pivoted to its first position.

13. The apparatus of claim 8 wherein said means for withdrawing said leaf spring clamping means to effect shuttle discharge of integrated circuit devices when said shuttle assembly is in said second position further comprises:
   (a) a pivotable shuttle upper jaw with an aperture retained therein for the protrusion of said leaf spring clamping means;
   (b) a shaft carried by said shuttle upper jaw and held transversely thereto; and
   (c) at least two prongs mounted proximate a discharge chute for abutting and lifting said shaft, pivoting said shuttle upper jaw and lifting said leaf spring when said shuttle assembly pivots to its second position.

14. Apparatus for handling and transferring integrated circuit devices comprising:
   (a) a shuttle assembly;
   (b) means for pivoting said shuttle assembly between a first position, in registration with an intake chute, and a second position, angularly spaced from said first position, in registration with a device discharge chute;
   (c) means for releasably enveloping an integrated circuit device within said shuttle assembly;
   (d) a leaf spring for releasably clamping an integrated circuit device within said shuttle assembly enveloping means to further secure an integrated circuit device therein;
   (e) means for overcoming said enveloping means to permit integrated circit device ingress into and egress from said shuttle assembly; and
   (f) means for withdrawing said leaf spring within said shuttle assembly enveloping means to permit an integrated circuit device to be released from said shuttle assembly.

15. The apparatus of claim 14 wherein said shuttle assembly further comprises:
   (a) a shuttle support arm;
   (b) one of several interchangeable shuttle lower jaws carried by said shuttle support arm;
   (c) a shuttle upper jaw pivotally attached relative to said shuttle lower jaw;
   (d) means for biasing said shuttle upper jaw to a closed position; and
   (e) means for urging said shuttle upper jaw to an open position when said shuttle assembly is in said first and second positions thereof.

16. The apparatus of claim 14 wherein said means for releasably enveloping an integrated circuit device within said shuttle assembly further comprises:
   (a) a shuttle lower jaw for receiving and supporting an integrated circuit device; and
   (b) a shuttle upper jaw pivotally mounted with respect to said shuttle lower jaw for retaining an integrated circuit device therebetween.

17. The apparatus of claim 14 wherein said means for overcoming said enveloping means to permit an integrated circuit device ingress into said shuttle assembly in said first position thereof further comprises:
   (a) a pivotably mounted shuttle upper jaw; and
   (b) a block mounted shoulder for striking said pivotally mounted shuttle upper jaw when said shuttle asembly is in said first position thereof.

18. The apparatus of claim 14 wherein said means for overcoming said enveloping means to permit integrated circuit device egress from said shuttle assembly further comprise:
   (a) a pivotably mounted shuttle upper jaw;
   (b) a shaft carried by said shuttle upper jaw and mounted transversely thereto;
   (c) at least two prongs mounted proximate a discharge chute for abutting and lifting said shaft and thereassociated shuttle upper jaw; and
   (d) means for pivoting said shuttle assembly to a second position in registration with a device discharge chute.

19. The apparatus of claim 14 wherein said means for withdrawing said leaf spring within said shuttle assembly enveloping means to permit an integrated circuit device to be released from said shuttle assembly, further comrpises:
   (a) means for attaching said leaf spring clamping means to said shuttle assembly;
   (b) a shuttle upper jaw of said shuttle assembly, pivotably mounted thereto, with an aperture formed therein for passage of said leaf spring clamping means therethrough; and
   (c) means for pivoting said shuttle upper jaw to an open position when said shuttle assembly is in said first and second positions thereof for carrying said leaf spring therewith.

* * * * *